United States Patent [19]

Läufer et al.

[11] 3,859,420

[45] Jan. 7, 1975

[54] PROCESS OF MAKING SUPER-DRY SILICON DIOXIDE

[75] Inventors: Siegmar Läufer; Waldemar Roy, both of Rheinfelden, Germany

[73] Assignee: Deutsche Gold-Und Silber-Scheideanstalt Vormals Roessler, Frankfurt/Main, Germany

[22] Filed: Aug. 26, 1971

[21] Appl. No.: 175,382

Related U.S. Application Data

[63] Continuation of Ser. No. 886,413, Dec. 18, 1969, abandoned.

[52] U.S. Cl. ............... 423/335, 423/338, 34/10
[51] Int. Cl. ............... C01b 33/12, C01b 33/18
[58] Field of Search .......... 423/335, 336, 337, 338, 423/339, 340; 23/182 V, 182 P, 182 R; 34/10, 22, 26

[56] References Cited
UNITED STATES PATENTS

| | | | |
|---|---|---|---|
| 2,660,564 | 11/1953 | Davis | 423/339 X |
| 3,053,627 | 9/1962 | Flemmert | 423/336 |
| 3,148,026 | 9/1964 | Roderburg et al. | 423/335 |
| 3,269,799 | 8/1966 | Gunn, Jr. | 423/336 |
| 3,367,742 | 2/1968 | Marotta et al. | 423/335 |
| 3,645,684 | 2/1972 | De Cuir | 423/336 |

FOREIGN PATENTS OR APPLICATIONS

| | | | |
|---|---|---|---|
| 726,250 | 3/1955 | Great Britain | 23/182 V |
| 894,383 | 4/1962 | Great Britain | 23/182 V |
| 642,816 | 5/1964 | Belgium | 23/182 R |

*Primary Examiner*—Edward Stern
*Attorney, Agent, or Firm*—Michael S. Striker

[57] ABSTRACT

A super-dry finely dispersed silicon dioxide that is free of adsorbed water and hydrogen bonded silanol groups, so-called "bonded" silanol groups, is made by subjecting the silicon dioxide to a current of dry gas in a fluidizing bed at a temperature from about 700° to about 1,000° C and at normal pressure for a period from a few seconds to a few minutes.

The product obtained is characterized also by retaining the more widely spaced isolated hydroxyl groups which cannot interact with one another by formation of hydrogen bridges.

6 Claims, No Drawings

PROCESS OF MAKING SUPER-DRY SILICON DIOXIDE

REFERENCE TO RELATED APPLICATIONS

The present application is a continuation of application Ser. No. 886,413 filed on Dec. 18, 1969 and now abandoned.

BACKGROUND OF THE INVENTION

The invention relates to a process for making a super-dry finely dispersed silicon dioxide by heating silicon dioxide, particularly such silicon dioxide as is obtained in a pyrogenic process of production.

The specific properties of highly dispersed silicon dioxide which is formed by the hydrolytic cleavage of silicon tetrachloride in a flame are largely due to the process of making the material and are particularly characterized by the small size of the primary particles, the desirable particle size distribution and the structure of its surface. These properties distinguish this type of silicon dioxide from other finely dispersed silicic acids such as are produced by a wet process.

The manner of making pyrogenic silicon dioxide results in a surface structure which is formed essentially by three types of so-called surface hydroxyl groups which are simultaneously present in all silicon dioxide aerogels. These three types of hydroxyl groups are the following:

1. Silanol groups which are present at the surface and which, because of the spacing from other silanol groups and their limited action range, cannot enter into any interaction and therefore may be called isolated or "free silanol groups."

2. Silanol groups of the same type as described at (1) which, however, are so closely spaced that they can interact together by formation of hydrogen bridges and which may therefore be described as "hydrogen bonded silanol groups," shortly called "bonded" silanol groups, and 3. the hydroxyl groups of surface-adsorbed water present in the silicic acid aerogels.

The properties of the silicon dioxide aerogels are not determined by the totality of all its hydroxyl groups nor, as can be shown experimentally, by the totality of all silanol groups; rather, each of the three different hydroxyl types has its share in the particular properties of the product.

For industrial purposes a filler is generally preferred which consists of a highly pure and dry silicon dioxide which, in addition to silanol groups, still includes hydroxyl groups. On the other hand, as adsorbent or also as a filler for specific purposes, a silicon dioxide is preferred which is as free as possible of hydroxyl groups and closely spaced silanol groups.

When making a highly dispersed silicon dioxide in the flame hydrolysis process, it is customary to effect the precipitation of the finely dispersed oxides at temperatures where undesirable condensation of the products formed during the reaction, such as water or aqueous hydrochloric acid, is avoided. The final products, however, still include certain additives depending on the type of starting products and the thermic oxidation or hydrolysis. For instance, if the process starts from silicon tetrachloride, a product is obtained which still retains certain amounts of hydrogen chloride as determined by the high adsorption properties of the formed silicic acid aerosol. In order to remove the hydrogen chloride, it is well known to subject the finely dispersed oxides to a heat treatment at temperatures of about 200° to 500° C and, in any case, below red heat. This treatment may be effected immediately after precipitation. Another method is to subject the oxides to a deacidification by means of superheated steam at similar or also lower temperatures in a unidirectional current or countercurrent. In this case, a good deacidification is obtained, but a certain residual humidity cannot be eliminated from the aerogel.

One of the most important properties of the silicon dioxide aerogel is its thickening action in which the adsorbed humidity, that is adsorbed water, is important. It has been found in this connection that an anhydrous silicon dioxide aerogel has a better thickening action in carbon tetrachloride than a silicon dioxide aerogel which still contains 1 to 2% water. The products thus obtained usually meet the requirements. However, there are special uses for which absolutely dry products are necessary.

Such absolutely dry silicon dioxide aerogel can be obtained by a vacuum treatment at specific conditions such as an increased temperature or with the aid of isothermal distillation. However, the product will still retain a more or less substantial amount of "bonded silanol groups."

Scientific investigations have shown that silicon dioxide aerogel which was obtained by pyrolitic decomposition of, for instance, silicon tetrachloride to a silicon dioxide aerogel with subsequent coagulation and after pressure shaping into thin laminae this silicon dioxide not only loses the adsorbed water while being heated to 800° to 1,000° C through extended periods such as 8 hours at a reduced pressure of for instance $10^{-3}$ Torr, but releases also some of its silanol groups by condensation to water. This process can be traced by infrared spectroscopy since the individual hydroxyl types result in different band spectra. In this connection it is of particular interest that the so-called "free silanol groups" which are visible in the infrared spectrum as a well-defined band are retained, at least up to a certain extent, at this temperature. At less extended heating periods, the "bonded" silanol groups are likewise retained to a substantial extent since the completeness of the condensation of these groups depends both on the temperature and the time of treatment.

All the described processes used for making absolutely dry products have, however, the shortcoming that they either do not lead to products which are free of "bondedc" silanol groups or, as in case of the last-mentioned investigations, cannot be used for mass production and, besides, also result in products which no longer have the loose structure of the starting product and are therefore technically useless.

SUMMARY OF THE INVENTION

It is therefore an object of the present invention to provide a process for making a finely dispersed absolutely dry silicon dioxide by heating, particularly of pyrogenically obtained, silicon dioxide which results in a product which is entirely free of adsorbed water and of closely spaced silanol groups while, on the other hand, the remaining free silanol groups have not been affected and wherein the loose structure of the starting product is at least fully retained.

This is accomplished by subjecting the silicon dioxide to a current of a dry gas in a fluidizing bed at a temperature from about 700° to about 1,000° C and at normal pressure for a period from a few seconds to a few minutes.

The invention embraces also the product obtained by this process, which is characterized in that it retains the more widely spaced isolated silanol groups but is substantially free of hydroxyl groups formed by surface adsorbed water and surface silanol groups which are sufficiently closely spaced to be capable to interact by formation of hydrogen bridges.

DESCRIPTION OF THE PREFERRED EMBODIMENTS

Preferably the silica aerogel is a pyrogenically obtained aerogel such as formed by the hydrolytic cleavage of silicon tetrachloride in a flame and subsequent coagulation to an aerogel. The time of treatment is preferably between 1 and 60 seconds.

The fluidizing bed preferably is a vertical bed into which the silicon dioxide and the gas are passed in countercurrent. The dry gas is preferably preheated to a temperature between 100° and 300° C and preferably may be air.

Surprisingly, it can be experimentally shown that the silica aerogel obtained by the process of the invention and characterized by the absence of "bonded silanol groups" and freedom of adsorbed water while retaining the same or a smaller number of widely spaced free silanol groups has a better thickening effect than a usual, or even waterfree product which is obtained by a conventional pyrolytic process.

It has been found that these results can be obtained in pyrogenically obtained silicon dioxide aerogels and also in certain types of non-pyrogenically obtained silicic acids without application of reduced pressure and without extended periods of treatment. This result is obtained, as indicated above, by subjecting the silicon dioxide aerogel or another suitable type of silicic acid in a continuous apparatus to the above-given temperatures for a very short time as indicated while being exposed to a flow of dry gas. Preferably, the silica aerogel and the gas mixture are passed into the apparatus in countercurrent and preferably employing a vertical fluidizing bed.

It was particularly surprising that the removal of the water and the condensation of part of the silanol groups in silicon dioxide aerogels, which can be condensed at these temperatures, proceeds at a much faster pace and much more completely than in a partial vacuum. It was furthermore unexpected that, with such short time high-temperature treatment, the number of the more widely spaced free silanol groups is not affected, as distinguished from any vacuum treatment but is retained almost 100% as can be proven by infrared spectra of the final products. This is of great significance since it is this feature which is at the base of the technical value of the silicon dioxide aerogels as distinguished from precipitated silicic acids in which the silanol groups predominantly are closely spaced as so-called "bonded silanol groups" and in which the less closely spaced, so-called "free silanol groups" are of a comparatively insignificant amount.

It is also surprising that with the high-temperature treatment of the invention the rehydration property is fully retained, which is directly contrary to what has been reported in the literature in respect of silicic acids which had been subjected to calcination at such high temperatures.

A further advantage of the process of the invention is that all contaminations which are volatized at these temperatures, such as for instance any residual hydrogen chloride, are completely eliminated. Thus, the advantages of an extended heat treatment at lower temperatures surprisingly are retained with the short-time, high-temperature treatment of the invention while, on the other hand, the above-mentioned shortcomings of high temperatures are avoided, apparently because of the very short residence time in the apparatus.

The thermal process of the invention can be directly joined to the process of making the silicon dioxide aerogel by means of a subsequent stage of operation. However, it is also possible to carry out the processes at a separate place and at a different tme, for instance at the place of use immediately prior to further processing of the product. In both cases, an absolutely dry silica aerogel is obtained from which at the same time all acid has been removed.

The absence of "bonded" silanol groups and of adsorbed water make this product particularly suitable where a highly active product is desired.

There is thus obtained by this process a novel product which is a finely dispersed, absolutely dry silicon dioxide characterized by the retention of the free silanol groups and at the same time absence of hydroxyl groups of surface-adsorbed water and absence of or presence only in an infinitesimal amount of such surface hydroxyl groups which are capable to interact together upon formation of hydrogen bridges.

The high degree of activity does not only concern the addition or adsorption of reactive materials but also chemical reactions taking place with the silanol groups proceed in an easier and more complete manner with the product of the invention than with an untreated or previously dried aerogel. This high degree of activity also is expressed in chemical reactions with the reactive siloxane groups which are formed in substantial numbers by the process of the invention and which, on the one hand, similar to the silanol groups, are suitable for the cleavage of reactive materials and subsequent chemical reaction while, on the other hand, they are also fit for direct addition of, for instance, polar XH compounds such as alcohols or amines, etc.

The product of the present process can immediately be incorporated as such into any desired organic solvent and can then be used for shipping in this manner as absolutely dry silica aerogel without the risk that humidity enter this type of a paste during shipping or at the place of further processing.

The process of the invention can be used in connection with different kinds of, for instance, pyrogenically obtained silicon dioxide including also hydrophobized or otherwise surface-treated materials. All these starting products may thus be converted into silica aerogels of a particularly high activity.

Thus, it was for instance possible to treat silica aerogels with a surface between 100 and 400 m²/g and having various contents of water between 0.2 and 5.0%. All these materials could be modified by the process of the invention so as to exhibit an increased pH and also a change in their surface properties and a substantially increased thickening action and thixotropy.

Surprisingly, even silica aerogels with organic contaminations furnished highly active, extremely pure aerogels by the process of the invention though treated for a time of only a few seconds.

The following examples will serve to further explain the invention.

EXAMPLE 1

The following materials were subjected to comparative tests:

a. an untreated silica aerogel with a surface of 380 m²/g;

b. the same type of aerogel which had been dried at 110° C and $10^{-3}$ Torr for a period of 1½ hours;

c. the same type of silica aerogel as at (a) which had been heated at 950° C and 2 to 4 Torr in a tubular furnace for a period between 10 and 25 seconds; and d. again the same type of material as at (a) which had been treated for a time from 10 to 25 seconds at 950° C and normal pressure in countercurrent with an oxygen-containing gas mixture that has been preheated to between 150° and 200° C.

Equal amounts of the materials obtained in all these four processes were suspended in the same amount of carbon tetrachloride and sealed into test tubes.

Even after a prolonged time the marked differences in thickening action could be clearly recognized. These observations could still be made after a storage time of 4 months.

In each of the four tests (a), (b), (c) and (d) there was an increasing thickening action from (a) to (d). In the test (a) the thickening action could be considered inadequate. In test (b) the action could be considered adequate, while in test (c) it could be designated as good, and in test (d) it could be designated as excellent.

For instance, in test (d) there was obtained a viscosity of 500 cp by forming a 5% suspension of the product in pure dry carbon tetrachloride and measuring the viscosity with the "Rheometer" (stage I) after a period of 20 minutes.

EXAMPLE 2

Fresh silicon dioxide aerogel of a surface of 300 m²/g and a normal contents of adsorbed, (physisorbed) water of about 0.5% was treated in a tubular quartz furnace having a length of 1.20 m, a diameter of 25 mm and a heating zone of a length of 1 m. The material was subjected to the same process as in Example 1, test (d). It was thus converted into an absolutely dry, pure silica aerogel which was free of "bonded" silanol groups, as could be proven by the infrared spectrum of the starting product compared with the final product.

The product obtained in the infrared spectrum showed a single narrow strong band at about 3,700 cm$^{-1}$ within the range between 4,000 and 2,000 cm$^{-1}$.

In a continuous operation, there were obtained, depending on the input, 500 to 800 g per hour of the dry product. The amount of dry gas employed was between 50 and 100 l/h of air which had been preheated to between 100° and 200° C and was passed through the silica material in countercurrent.

EXAMPLE 3

In this case a silica aerogel was treated which had an initial pH of 2.55. The same treatment was applied as in Example 1, test (d). After a residence time of 1 second, the pH had risen to 3.30 and after another second the deacidification had proceeded to a pH of 3.85.

The final product was again an absolutely dry silica aerogel as described above.

EXAMPLE 4

The initial material in this case was a silica aerogel with a surface of 170 m²/g and a pH of 2.50. The material was treated by the process described in Example 1, test (d), with a residence time of between 2 and 5 seconds. After the treatment the material had a pH of 3.50.

The viscosity of the material was measured as described in Example 1, test (d) and was found to be in excess of 480 cp, while the viscosity of the starting product was found to be 384 cp.

EXAMPLE 5

A hydrophobized silica aerogel was treated as described in Example 1, test (d). Continuous operation with an hourly throughput of 500 g resulted in a product in which no carbon could be detected.

EXAMPLE 6

This example illustrates the high activity of the product obtained.

A silicon dioxide which had been treated as described in Example 1, test (d) was charged at 20° C with methanol vapor by exposing it for 4 hours to a saturation vapor pressure of methanol at the temperature indicated while excluding all other gases. The obtained product was then subjected for half an hour to a temperature of 100° C in a vacuum of $10^{-3}$ Torr. Analysis showed a carbon content of 0.4%.

For comparison, the same type of silicon dioxide which, however, had not undergone the short-time heat treatment, after drying of the adsorbed water at 100° C was treated exactly as described above with methanol vapor and heating. It had a carbon content of only 0.02%.

EXAMPLE 7

This example illustrates a treatment at a time remote from the time of making the silicon dioxide.

An aerogel ("Aerosil") which had been stored for about 2 years was subjected in this case to the treatment of the invention. The aerogel had a surface area of 200 m²/g and a water content (adsorbed, physisorbed water) of about 2%. The material was treated in a tubular quartz furnace of a length of 1,200 mm and an active heating area of 1,000 mm length and an internal diameter of 150 mm. The furnace was heated to a temperature between 900° and 1,100° C. Otherwise, the type of treatment was the same as in Example 1, test (d).

There was obtained in this process an absolutely dry pure silica aerogel which was absolutely free of "bonded" silanol groups as could be shown by a comparison of the infrared spectra of the starting product and the final product. The final product in the infrared spectrum between 4,000 cm$^{-1}$ and 2,000 cm$^{-1}$ showed only one single sharp intense band at about 3,700 cm$^{-1}$.

In a continuous process there were obtained 10 kg of the dry product in 1 hour. The gas employed was dry air which had been heated to 300° C and which was passed through the silica aerogel in countercurrent in an amount of about 4 m³/h.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process of making a silicon dioxide that is free of adsorbed water and of hydrogen-bonded silanol groups whose infrared spectrum is characterized by a single narrow intense band at a wavelength of about 3,700 cm$^{-1}$ within the range between 4,000 and 2,000 cm$^{-1}$ which is characteristic of free silanol groups which process comprises subjecting a pyrogenically produced silicon dioxide aerogel containing adsorbed water and both free and hydrogen-bonded silanol groups to treatment in a fluidized bed at a temperature between about 700° and 1,000° C and at a pressure between 2 torr and atmospheric pressure for a period between one second and a few minutes through which fluidized bed a stream of a dried gas that had been preheated to a temperature between 100° and 300° C is passed.

2. The process of claim 1, wherein the silicon dioxide is a silicon dioxide used as starting material obtained by hydrolytic cleavage of silicon tetrachloride in a flame.

3. The process of claim 1, wherein the treatment is carried out in a vertical fluidizing bed in countercurrent.

4. The process of claim 1, wherein the dry gas is air.

5. The process of claim 1 which is carried out at atmospheric pressure and wherein the dry gas is passed in countercurrent direction through the silicon dioxide.

6. The process of claim 1 wherein the silicon dioxide used as starting material is a hydrophobized silicon dioxide.

* * * * *

UNITED STATES PATENT OFFICE
CERTIFICATE OF CORRECTION

PATENT NO. : 3,859,420
DATED : Jan. 7, 1975
INVENTOR(S) : Siegmar Läufer and Waldemar Roy It is certified that error appears in the above—identified patent and that said Letters Patent are hereby corrected as shown below:

In column 8, add the following claim:

-- 7. A process as defined in claim 1 in which the silicon dioxide aerogel is subjected to treatment in the fluidized bed for a period between 1 and 60 seconds. --.

On the cover sheet "6 Claims" should read -- 7 Claims --.

Signed and Sealed this twenty-eight Day of October 1975

[SEAL]

Attest:

RUTH C. MASON
*Attesting Officer*

C. MARSHALL DANN
*Commissioner of Patents and Trademarks*